United States Patent [19]

Lagarde

[11] Patent Number: 4,782,107

[45] Date of Patent: Nov. 1, 1988

[54] HEAT-VULCANIZABLE ORGANOPOLYSILOXANE COMPOSITIONS

[75] Inventor: Robert Lagarde, Feyzin, France

[73] Assignee: Rhone-Poulenc Specialites Chimiques, Courbevoie, France

[21] Appl. No.: 1,433

[22] Filed: Jan. 8, 1987

[30] Foreign Application Priority Data

Jan. 9, 1986 [FR] France ............................. 86 00403

[51] Int. Cl.$^4$ .............................................. C08K 3/18
[52] U.S. Cl. .................... 524/433; 524/436; 524/779; 524/785; 524/788; 524/786; 524/860; 525/479
[58] Field of Search ................ 525/479; 524/433, 436, 524/779

[56] References Cited

U.S. PATENT DOCUMENTS

| | | | |
|---|---|---|---|
| 3,261,801 | 7/1966 | Wormuth | 524/431 |
| 3,379,607 | 4/1968 | Foster et al. | 528/30 |
| 3,514,424 | 5/1970 | Noble et al. | 524/448 |
| 3,711,520 | 1/1973 | Pfeifer et al. | 524/403 |
| 3,865,778 | 2/1975 | Christe | 260/37 |
| 4,202,812 | 5/1980 | Murray | 524/493 |
| 4,301,056 | 11/1981 | Patzke et al. | 524/436 |

FOREIGN PATENT DOCUMENTS 0062427 10/1982 European Pat. Off. .
2066277 7/1981 United Kingdom .

*Primary Examiner*—Melvyn I. Marquis
*Attorney, Agent, or Firm*—Burns, Doane, Swecker & Mathis

[57] ABSTRACT

Heat-vulcanizable organopolysiloxane compositions, adopted for curing into silicone elastomers having improved reversion and oil resistance and useful, e.g., as seals in contact with hot oils, comprise at least one diorganopolysiloxane resin (A) having a viscosity of greater than 1,000,000 mPa.s at 25° C., a reinforcing and/or semireinforcing filler material (B), an organic peroxide (C), an organosilicon compound (D) containing at least one acryloyloxyalkyl or methacryloyloxyalkyl group bonded to a silicon atom, and (E) at least one oxide or hydroxide of an alkaline earth metal.

11 Claims, No Drawings

HEAT-VULCANIZABLE ORGANOPOLYSILOXANE COMPOSITIONS

BACKGROUND OF THE INVENTION

1. Field of the Invention

The present invention relates to heat-curable organopolysiloxane compositions formulated by admixing diorganopolysiloxane resins, fillers, a group of individual additives and organic peroxides.

2. Description of the Prior Art

Heat-curable or vulcanizable organopolysiloxane compositions are well known to this art and have the advantage, on the one hand, of being easy to process in the raw state and, on the other, of providing, after heat-curing, elastomers which are characterized by good physical properties.

The introduction of various additives in order to modify the properties of organopolysiloxane compositions, and of the resultant elastomers, is widely described in the literature, patent or otherwise, the earliest of which date back to the beginnings of the commercialization of heat-cured silicone elastomers.

Thus, U.S. Pat. No. 3,379,607 describes the addition of a compound such as methacryloyloxypropyltrimethoxysilane to a polysiloxane elastomer.

U.S. Pat. No. 4,202,812 describes adding acryloyloxy (or methacryloyloxy)alkylalkoxysilane in a proportion of 0.08 to 0.3 parts of additive per 100 parts of a silicone rubber base combined with 25 to 300 parts of nonreinforcing fillers in order to improve the tensile properties of the vulcanized elastomers.

Published European patent application EP-A-149,882 describes the addition, to an organopolysiloxane elastomer composition, of a mixture of additives which may be an organosilicone compound containing an acryloyl- (or methacryloyl)oxyalkyl group combined with at least two other additives selected from among an organohydropolysiloxane, an organofluoro polymer and a boron-containing compound. Furthermore, at page 18, lines 6 to 12, of this '882 application, it is indicated that this mixture of additives may additionally contain other adjuvants which are well known to the silicone rubber art, especially calcium, magnesium and barium hydroxides and oxides, which neutralize the decomposition products formed during crosslinking or at elevated temperature, as described, for example, in published European patent application EP-A-51,369.

U.S. Pat. No. 3,261,801 describes improving the reversion resistance of silicone rubbers by adding from 0.1 to 10 parts of a barium oxide per 100 parts of organopolysiloxane resin.

In U.S. Pat. No. 3,711,520 the flame resistance of silicone rubbers imparted by the addition of platinum (U.S. Pat. No. 3,514,424) is improved by additionally adding an oxide of an alkaline earth metal or of a Group 2b metal (Zn, Cd, Hg).

Japanese application Kokai No. 48/093,658 describes the conjugate addition to an organopolysiloxane composition of an organohydropolysiloxane and a calcium derivative such as CaO and Ca(OH)$_2$ to improve the residual compression set and to eliminate efflorescence.

U.S. Pat. No. 4,301,056 describes improving reversion resistance, the residual compression set and hot oil resistance by the introduction of calcium hydroxide treated with an organosilicon compound.

Presently, the internal combustion engine automotive industry is in full expansion for silicone elastomers as a result of the increase in the internal temperature of the engines, in order to improve their thermal efficiency and to reduce fuel consumption. Motor vehicle manufacturers are therefore seeking to replace the conventional rubbers which have an inadequate thermal resistance by other rubbers, especially by silicone rubbers.

Therefore, serious need exists in this art for an organopolysiloxane elastomer composition which cures to a silicone rubber which, on the one hand, has and retains, when heated in contact with the various oils employed in an internal combustion vehicle, good mechanical properties, such as residual compression set and good elasticity and, on the other hand, has good resistance to various types of hot oils in contact with the silicone rubber seals in closed systems.

SUMMARY OF THE INVENTION

Accordingly, a major object of the present invention is the provision of an improved organopolysiloxane elastomer composition which avoids the aforesaid disadvantages and drawbacks to date characterizing the state of this art.

Briefly, the present invention features a heat-vulcanizable organopolysiloxane elastomer composition comprising:

(A) 100 parts of at least one diorganopolysiloxane resin having a viscosity greater than 1,000,000 mPa.s at 25° C., (B) 5 to 150 parts of a reinforcing filler, (C) 0.1 to 7 parts of an organic peroxide, (D) 0.01 to 5 parts of an organosilicon compound containing, bonded to the silicon atom, at least one acryloyloxyalkyl or methacryloyloxyalkyl group, and (E) 0.1 to 20 parts of at least one oxide or hydroxide of an alkaline earth metal.

DETAILED DESCRIPTION OF THE PREFERRED EMBODIMENTS OF THE INVENTION

More particularly according to the present invention, in contrast to the prior art, it has now surprisingly and unexpectedly been shown that a considerable synergy of the additives (D) and (E) respectively exists, with regard to the improvement and the retention of mechanical properties and of the oil resistance of the silicone rubbers resulting from the vulcanization of organopolysiloxane compositions. As utilized herein, all parts and percentages are on a weight basis, unless otherwise indicated.

The resins (A) are well known materials, commercially available from the manufacturers of silicones, and they may also be prepared using methods well known to this art.

The diorganopolysiloxane resins (A), having a viscosity greater than 1,000,000 mPa.s at 25° C., preferably greater than 2,000,000 mPa.s at 25° C., are linear polymers, of high molecular weight, the diorganopolysiloxane chain of which consists essentially of units of the formula $R_2SiO$; this polymer chain is blocked at each end by units of the formula $R_3SiO_{0.5}$ and/or the radical of the formula OR'. R and R' are organic, especially alkyl, radicals. The presence of small amounts of units other than $R_2SiO$ in the diorganopolysiloxane chain, for example, units of the formula $RSiO_{1.5}$ and/or $SiO_2$ is not excluded, however, in a proportion not exceeding 2% relative to the number of $R_2SiO$ units. Although the definitions of the radicals R and R' will be set forth in greater detail below, by "alkyl" radical is intended a $C_1$–$C_4$ alkyl radical and more especially the methyl, ethyl, n-propyl and n-butyl radicals.

As specific examples of units of the formulae $R_2SiO$ and $R_3SiO_{0.5}$ and of radicals of formula OR', representative are those of the formulae:
$(CH_3)_2SiO$, $CH_3(CH_2=CH)SiO$, $CH_3(C_6H_5)SiO$, $(C_6H_5)_2SiO$, $CH_3(C_2H_5)SiO$, $(CH_3CH_2CH_2)CH_3SiO$, $CH_3(n-C_3H_7)SiO$, —$(CH_3)_3SiO_{0.5}$, $(CH_3)_2CH_2=CHSiO_{0.5}$, $(CH_3)(C_6H_5)_2SiO_{0.5}$, —$(CH_3)(C_6H_5)CH_2=CH)SiO_{0.5}$, —OH, —$OCH_3$, —$OC_2H_5$, —O—n—$C_3H_7$, —O—iso—$C_3H_7$, —O—n—$C_4H_9$, —$OCH_2CH_2OCH_3$.

The preferred resins (A) are resins formed by a concatenation of siloxy units of the formula $R_2SiO$, which are blocked at each end of their polymer chains by a siloxy unit of the formula $R_3SiO_{0.5}$ and/or a radical of the formula OR'; in these formulae the symbols R, which are identical or different, represent methyl, ethyl, n-propyl, phenyl, vinyl and 3,3,3-trifluoropropyl radicals, at least 60% of the number of these radicals being methyl radicals and at most 3 mol % of the siloxy units being organovinylsiloxy units, and the symbol R' represents a hydrogen atom, an alkyl radical containing from 1 to 4 carbon atoms or the beta-methoxyethyl radical.

According to this invention, the use of vinylated dimethylpolysiloxane resins is most particularly preferred, that is to say, those containing vinyl radicals bonded to the silicon atoms in the polymer chain and/or at the ends of the chain in a molar concentration of vinylmethylsiloxy units not exceeding 1%.

The fillers (B), preferably reinforcing silicas (B), are used in a proportion of 5 to 150 parts, preferably 8 to 100 parts, per 100 parts of diorganopolysiloxane resins (A). They are selected from among pyrogenic silicas and precipitated silicas. They have a specific surface area, measured using the BET and CTAB methods, of at least 50 m²/g, preferably greater than 70 m²/g, a primary particle mean size of less than 80 nanometers and an apparent density of less than 200 g/liter.

These silicas may be incorporated as such or after they have been treated with organosilicon compounds which are typically employed for this purpose. These compounds include methylpolysiloxanes, such as hexamethyldisiloxane and octamethylcyclotetrasiloxane, methylpolysilazanes, such as hexamethyldisilazane and hexamethylcyclotrisilazane, chlorosilanes, such as dimethyldichlorosilane, trimethylchlorosilane, methylvinyldichlorosilane and dimethylvinylchlorosilane, and alkoxysilanes, such as dimethyldimethoxysilane, dimethylvinylethoxysilane and trimethylmethoxysilane. During this treatment, the silicas may increase in their initial weight to a degree of up to 20%, preferably approximately 18%.

In addition to the reinforcing silicas (B'), there may be introduced semi-reinforcing or packing inorganic fillers (B'). These fillers (B') are coarser and have a mean particle greater than 0.1 μm. These fillers (B') are represented more especially by ground quartz, calcined clays, diatomaceous silicas, calcium carbonate, iron, titanium, magnesium and aluminum oxides, zinc sulfate and barium sulfate. They are introduced in a proportion of 5 to 120 parts, preferably from 10 to 50 parts, per 100 parts of resin (A). These inorganic fillers may be used as such, namely, untreated, or treated with the aforementioned organosilicon compounds as was the case with the reinforcing silicas (B).

The organic peroxides (C) are used in a proportion of 0.1 to 7 parts, preferably 0.2 to 5 parts, per 100 parts of the resins (A). They are well known to this art and comprise, more especially, benzoyl peroxide, 2,4-dichlorobenzoyl peroxide, dicumyl peroxide, 2,5-bis-(tert-butylperoxy)-2,5-dimethylhexane, tert-butyl perbenzoate, tert-butylperoxy isopropyl carbonate, di-tert-butyl peroxide and 1,1-bis(tert-butylperoxy)-3,3,5-trimethylcyclohexane.

These various peroxides decompose at temperatures and rates which are sometimes different. They are selected as a function of the required cure conditions. In the event that vinyl resins are used, 2,5-bis(tert-butylperoxy)-2,5-dimethylhexane is more particularly suitable.

The compositions according to the invention may additionally comprise 0.1 to 10 parts, preferably 0.3 to 5 parts of a diorganopolysiloxane oil having a viscosity not exceeding 5,000 mPa.s at 25° C., formed by a concatenation of units of the formula $R''_2SiO$ and blocked at each end of its polymer chain with a radical of the formula OR'; in these formulae the symbols R'', which are identical or different, represent methyl, phenyl or vinyl radicals, at least 40% of the number of these radicals being methyl, and the symbol R' has the meaning given under (A).

Additionally, diorganopolysiloxane oils (F) may be employed in a proportion of 0.1 to 10 parts, preferably 0.3 to 5 parts per 100 parts of the diorganopolysiloxane resins (A). These are linear polymers of a relatively low viscosity, not exceeding 5,000 mPa.s at 25° C., preferably not exceeding 4,000 mPa.s at 25° C., the diorganopolysiloxane chain of which is formed essentially by units of the abovementioned formula $R''_2SiO$; this chain is blocked at each end by a radical of the abovementioned formula OR'. At least 40% of the number of the radicals R'' are methyl radicals, preferably at least 45%.

The definitions of the symbols R'' and R' were set forth above.

As specific examples of units of the formula $R''_2SiO$ and of radicals of formula OR', representative are those of the formulae:
$(CH_3)_2SiO$, $CH_3(CH_2=CH)SiO$, $CH_3(C_6H_5)SiO$, $(C_6H_5)_2SiO$, $C_6H_5(CH_2=CH)SiO$, —OH, —$OCH_3$, —$OC_2H_5$, —O—n—$C_3H_7$, —$OCH_2CH_2OCH_3$.

Those preferably used are dimethylpolysiloxane oils blocked at each end of their polymer chain by hydroxyl, methoxy or beta-methoxyethoxy radicals, having a viscosity of 10 to 200 mPa.s at 25° C.; and methylphenylpolysiloxane oils consisting of $CH_3(C_6H_5)SiO$ units, blocked at each end of their polymer chain by hydroxyl and/or methoxy radicals, having a viscosity of 40 to 2,000 mpa.s at 25° C.

The use of the oils (F) is intended to prevent the compositions of the invention from undergoing a change during storage, and, more precisely, becoming structured and curing; they are thus "anti-structuring" agents. Their use is particularly recommended when the amounts of reinforcing silicas (B) are high, for example, above 30–40 parts per 100 parts of resins (A).

Other "anti-structuring" agents may replace all or a part of the oils (F), for example, diphenylsilanediol and the silanes of the formulae:

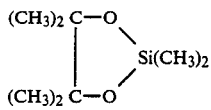

and

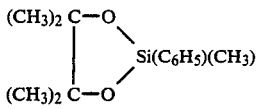

However, these are frequently more costly and/or demand more work to disperse them in the compositions of the invention than the oils (F).

The organosilicon compound (D) bearing at least one acryloyloxyalkyl or methacryloyloxyalkyl group may be selected from among:

(i) a silane (1) corresponding to the formula:

$$CH_2=CR^1COO(CH_2)_aSi(OR^2)_{3-b} \overset{R''_b}{|} \quad (1)$$

in which the symbol R" represents methyl, vinyl and phenyl radicals, the symbol $R^1$ represents a hydrogen atom or the methyl radical, the symbol $R^2$ represents a methyl, ethyl, n-propyl or beta-methoxyethyl radical, the symbol a represents a number from 1 to 5 and the symbol b represents a number from 0 to 2;

(ii) the products of partial hydrolysis of the above silane (1);

(iii) the polymers resulting from the reaction of the silane (2) of formula $CH_2=C(R^1)COO(CH_2)_aSi(OR^2)_3$, this formula being derived from the above formula when b=O, with a diorganopolysiloxane oil selected from the oils (F) which are blocked at each end of their polymer chain by a hydroxyl radical.

The organosilicon compounds (D) are used in a proportion of 0.01 to 5 parts, preferably 0.1 to 2 parts, per 100 parts of the diorganopolysiloxane resins (A). They include the silanes corresponding to the abovementioned general formula:

$$CH_2=C(R^1)COO(CH_2)_aSi(R'')_b(OR^2)_{3-b} \quad (1)$$

in which, as already indicated, the symbol R" represents a methyl, vinyl or phenyl radical, the symbol $R^1$ represents a hydrogen atom or the methyl radical, the symbol $R^2$ represents a methyl, ethyl, n-propyl or beta-methoxyethyl radical, the symbol b represents a number from 1 to 5 and the symbol represents a number from 0 to 2. They thus comprise the methacryloyloxyalkylalkoxysilanes and the acryloyloxyalkylalkoxysilanes which are described, for example, in U.S. Pat. No. 3,567,497.

As specific examples of these silanes, representative are those of the formulae:
$CH_2=CH-COO(CH_2)_3Si(OCH_3)_3$
$CH_2=CH-COO(CH_2)_3Si(OCH_2CH_2OCH_3)_2C_6H_5$
$CH=CH-COO(CH_2)_3Si(OC_2H_5)_3$
$CH=C(CH_3)COO(CH_2)_3Si(OCH_3)_3$
$CH_2=C(CH_3)COO(CH_2)_3SiCH_3(OCH_3)_2$
$CH_2=C(CH_3)COO(CH_2)_5Si(OCH_3)_3$ In addition to the silanes (1), there may be used, in the same proportions, their partial hydrolysis products, which correspond to the mean general formula:

$$CH_2=C(R^1)COO(CH_2)_aSi(OR^2)_cO_{\frac{[3-(b+c)]}{2}} \overset{|}{(R'')_b}$$

in which the symbols R", $R^1$, $R^2$, a and b have the meaning given above in conjunction with the formula of the silanes and the symbol c represents any number ranging from 0.5 to 2.2, the sum b+c ranging from 0.8 to 2.5. It is recommended that the hydrolysis of the silanes be carried out at temperatures in the range of 30 to 100° C., in the presence of an acidic catalyst such as hydrochloric acid, phosphoric acid or acetic acid, with a molar amount of water which is less than the amount required to hydrolyze all of the $SiOR^2$ bonds (one mol of water theoretically makes it possible to convert two $SiOR^2$ bonds into one Si—O—Si siloxane bond). The hydrolysis may take place in a hydrocarbon or halohydrocarbon solvent, or otherwise.

Other than the silanes (1) and the products of their partial hydrolysis, there may also be used, and in the same proportions, the products of reaction of the silanes (2) of the formula:

$$CH_2=C(R^1)COO(CH_2)_aSi(OR^2)_3$$

(which formula is derived from that of the silanes (1) when b=0 with diorganopolysiloxane oils (F) which are limited to those blocked at each end of their polymer chain by a hydroxyl radical, having a viscosity of 70 to 500 mPa.s at 25° C. and containing at least 60% of methyl radicals and not more than 3% of vinyl radicals. These oils will hereinafter be designated (F').

The oils (F') and the silanes (2) should be mixed in proportions such that the molar ratio $SiOH/SiOR^4$ ranges from 0.1 to 0.95. In addition, the reaction is catalyzed with the aid of a compound selected from alkyl titanates and polytitanates and diorganotin salts of aliphatic carboxylic acids, in a proportion of 0.05 to 2 parts per 100 parts of the mixture of oils (F') and silanes (2). The alcohol of the formula $R^4OH$ which is formed during the reaction may be retained in or removed from the reaction mixtures. If it is removed, then 45% of the theoretical weight amount based on the number of the SiOH and $SiOR^4$ radicals present in the mixtures should not be exceeded. A process of this type is described in French Pat. No. 2,447,386; it provides stable organopolysiloxane compositions having a viscosity of 60 mPa.s to 20,000 mPa.s at 25° C.

As component (E), at least one oxide or hydroxide of the alkaline earth metals may be used, i.e., of beryllium, magnesium, calcium, strontium, barium and radium, at a concentration of 0.1 to 20 parts, preferably 0.4 to 10 parts, per 100 parts of resin (A).

Calcium oxide CaO, magnesium oxide MgO, calcium hydroxide $Ca(OH)_2$ and magnesium hydroxide $Mg(OH)_2$ are the preferred compounds (E).

The compounds (E) may be introduced as such into the organopolysiloxane composition or may already be present on the surface of the fillers (B), as described, for example, in U.S. Pat. No. 4,463,108, or alternatively, in the case where calcium hydroxide is used, this compound may have been treated beforehand with an organosilicon compound similar to those described above for the treatment of the fillers (A), in accordance with U.S. Pat. No 4,301,056.

Other additives may be added to the compositions according to the invention in particular:

(i) platinum or a platinum compound in accordance with U.S. Pat. No. 3,514,424 in order to improve flame resistance, (ii) a fatty (stearic, lauric, oleic, palmitic) acid, or metal salt thereof, to improve processability in accordance with Japanese Application Kokai No. 58/027,749, and (iii) a heat stabilizer selected from among an iron salt of an organic acid, for example, iron octoate, in a proportion of 20 to 50 ppm of iron based on the total weight of the composition, and titanium oxide, in accordance with U.S. Pat. Nos. 3,647,741 and 3,692,737.

The preparation or formulation of the compositions in accordance with the invention is carried out with the aid of known mechanical means, for example, kneaders, roll mills or screw mixers. The various constituents are introduced into these machines in any order. It is recommended, however, to charge the resins (A) and the reinforcing silicas (B) first and the peroxides (C) last.

The final product compositions are stable in storage. They are particularly suitable for molding and for extrusion molding.

They can be cured to elastomers by heating under pressure or in ambient air at temperatures on the order of 100° to 350° C, and/or by irradiation using gamma radiation at doses of between 8 and 20 Mrad. The heating time naturally varies with the temperature, the pressure and the nature of the peroxides; it is generally a few minutes at about 100°–200° C. and a few seconds at about 250°–350° C. The irradiation treatment enables oil resistance to be further improved in accordance with French Pat. No. 2,057,433.

The elastomers formed in this manner, especially those produced by molding, may be subsequently heated in the range of 200°–280° C., for a period of time of at least one hour, in order to complete their crosslinking and to remove the volatile substances which they contain.

The compositions according to the invention may be used for the manufacture, by molding, calendering, or extrusion, of many components made of silicone elastomers or of articles covered with these elastomers, especially for producing seals which are in contact with the various hot oils employed in the manufacture of mechanical components.

In order to further illustrate the present invention and the advantages thereof, the following specific examples are given, it being understood that same are intended only as illustrative and in nowise limitative.

EXAMPLE 1

Preparation of the masterbatch MB:

The following ingredients were intimately mixed in a pug mill:

(i) 100 parts of a dimethylmethylvinylpolysiloxane resin (A) blocked at both of its polymer chain ends by a trimethylsiloxy unit and comprising in its chain 99.8 mol % of dimethylsiloxy units and 0.2 mol % of vinylmethylsiloxy units and having a viscosity of 10,000,000 mPa.s at 25° C., (ii) 45 parts of filler (B), which was a pyrogenic silica with a BET specific surface area of 300 m$^2$/g, (iii) 0.5 part of gamma-methacryloyloxypropyl-trimethoxysilane (component (D)), (iv) 1.6 parts of a dimethylpolysiloxane oil having a viscosity of 50 mPa.s at 25° C., blocked at each of its polymer chain ends (oil (F)) by a silanol group, and (v) 3 parts of MgO (component (E)).

The milling was stopped 30 minutes after addition of the silica was completed. The homogeneous composition just prepared was removed from the pug mill and is referred to as the masterbatch (MB).

The MB was transferred onto a 2-roll mill to incorporate 0.5% of peroxide (D), which was 2,5-dimethyl-2,5-di(tert-butylperoxy)hexane and 60% of filler (B'), which was ground quartz (B'$_1$) of specific surface area 1.7 m$^2$/g (% based on the weight of MB).

The composition was cured to an elastomer by being heated in molds, some of which had a depth of 2 mm and others of 8 mm, for 10 minutes at 170° C. at a pressure of 30 bars. Plaques which were in a nonpostcured (NP) state were thus obtained.

Various batches of plaques were then subjected:
(a) to a postcure P for 4 hours at 200° C.,
(b) to a postcure P for 16 hours at 200° C.,
(c) to an aging for 7 days at 225° C., and
(d) to an aging for 10 days at 225° C.

Standardized specimens were then sampled from these plaques and the following properties were measured:

(1) Shore A hardness (SAH) according to ASTM Standard D 2,240, (2) linear shrinkage (LS) in %, (3) tensile strength (S) according to AFNOR Standard T 46,002, corresponding to the ASTM Standard D 412, in mPa, (4) elongation at break (EB) in % according to the above Standard T 46,002, (5) tear strength (TS) according to ASTM Standard D 624, in kN/m, (6) residual compression set (RCS), measured in % after optional heating of the specimens under 25% compression, Zwick resilience (ZR) in % according to DIN Standard 53 512, (7) elasticity modulus (EM) at 100% in mPa.

The oil resistances were determined after postcuring for 16 hours at 200° C. in the standardized oil ASTM 1 (70 hours at 180° C.) in the standardized oil ASTM 3 of an aromatic nature (70 hours at 150° C.) and in Sunfill T 141 ® oil marketed by Sonoco, which was the most closely related to engine oils (1 month at 150° C.), this latter oil being generally more reactive than the ASTM 1 and ASTM 3 oils.

Measurements were then made for each of the oils of the differences Δ in % increase or decrease in some of the properties indicated above (ΔSAH, ΔS, ΔEB), as well as the related changes in weight ΔW and volume (ΔV).

EXAMPLES 2 TO 12 AND COMPARATIVE EXAMPLES 13 TO 21:

The compositions of Examples 1 to 12 and of Comparative Examples 13 to 19 are reported in Table 1, in which (B'$_2$) represents a diatomaceous earth (finely ground fossils or shells) and C$_2$ is 2,4-dichlorobenzoyl peroxide. Naturally, the compositions of Examples 2 to 12 and of Comparative Examples 13 to 21 were produced by following the operating procedure of Example 1.

Measurements of mechanical properties and of oil resistance, measured as in Example 1, are reported in Tables 2 to 6 below.

In Tables 2 and 3, it is shown that the addition of silane (D) by itself (Comparative Examples 14 and 15) to the masterbatch MB (Comparative Example 13) improved the mechanical properties, but tended to lower the oil resistance.

Tables 4, 5 and 6 show the effect on the mechanical properties of the synergy of a simultaneous addition of additives (D) and (E) without filler (B') (Examples 5, 7 and 8) or with filler (B') (Examples 1 to 4 and 9 to 12).

In Comparative Examples 19, 20 and 21 (Table 6), it is shown that the addition of component (E) by itself did not produce a appreciable improvement in oil resistance and mechanical properties and that the addition of component (D) by itself improved only the mechanical properties, whereas the simultaneous addition of the additives (D) and (E) produced a synergy in respect of oil resistance and mechanical properties.

Comparative Example 18 demonstrates that the substitution of calcium octoate for additive (E) did not make it possible to attain the objective of the present invention.

TABLE 1

| Constituents in parts | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| A | 100 | 100 | 100 | 100 | 100 | 100 | 100 | 100 | 100 | 100 | 100 |
| B | 45 | 45 | 45 | 45 | 45 | 45 | 45 | 45 | 45 | 45 | 45 |
| B'* | | | | | | | | | | | |
| B'1 | 60 | 60 | — | 50 | — | — | — | 50 | — | 60 | 60 |
| B'2 | — | — | — | — | — | — | — | — | — | 50 | — |
| $C_1$* | 0.5 | 0.5 | 0.5 | 0.5 | 0.5 | — | 0.5 | 0.5 | 0.5 | 0.5 | 0.5 |
| $C_2$* | — | — | — | — | — | 0.6 | — | — | — | — | — |
| D | 0.5 | 0.5 | 0.5 | 1 | 0.5 | 0.5 | 1 | 0.5 | 1 | 1 | 0.5 |
| E | | | | | | | | | | | |
| MgO | 3 | 5 | 1 | 1 | — | — | — | — | — | — | — |
| CaO | — | — | — | — | 0.5 | 1 | 1 | — | 1 | 1 | 3 |
| $Ca(OH)^2$ | — | — | — | — | — | — | — | 1 | — | — | — |
| F | 1.6 | 1.6 | 1.6 | 1.6 | 1.6 | 1.6 | 1.6 | 1.6 | 1.6 | 1.6 | 1.6 |
| Ca acetate | — | — | — | — | — | — | — | — | — | — | — |

| Constituents in parts | Examples | | | | | | | | | |
|---|---|---|---|---|---|---|---|---|---|---|
| | 12 | 13 | 14 | 15 | 16 | 17 | 18 | 19 | 20 | 21 |
| A | 100 | 100 | 100 | 100 | 100 | 100 | 100 | 100 | 100 | 100 |
| B | 45 | 45 | 45 | 45 | 45 | 45 | 45 | 45 | 45 | 45 |
| B'* | | | | | | | | | | |
| B'1 | — | — | — | — | — | — | — | — | — | — |
| B'2 | — | — | — | — | 60 | 60 | — | — | — | — |
| $C_1$* | 0.5 | 0.5 | 0.5 | 0.5 | 0.5 | 0.5 | 0.5 | — | — | — |
| $C_2$* | — | — | — | — | — | — | — | 0.6 | 0.6 | 0.6 |
| D | 0.5 | — | 0.5 | 1 | 0.5 | 0.5 | 0.5 | — | — | 0.5 |
| E | | | | | | | | | | |
| MgO | — | — | — | — | — | — | — | — | — | — |
| CaO | 5 | — | — | — | — | — | — | 1 | — | — |
| $Ca(OH)^2$ | — | — | — | — | — | — | — | — | — | — |
| F | 1.6 | 1.6 | 1.6 | 1.6 | 1.6 | 1.6 | 1.6 | 1.6 | 1.6 | 1.6 |
| Ca acetate | — | — | — | — | — | — | 0.5 | — | — | — |

*in weight % based on the weight of MB

TABLE 2

| | 13 | 14 | 15 |
|---|---|---|---|
| SAH | | | |
| NP | 46 | 57 | 62 |
| P: 16 hours at 200° C. | 56 | 65 | 70 |
| P: 10 days at 225° C. | 66 | 71 | 75 |
| P: 7 days at 250° C. | 67 | 74 | 81 |
| LS | | | |
| NP | 3.8 | 3.8 | 3.8 |
| P: 16 hours at 200° C. | 4.9 | 5.3 | 4.9 |
| P: 10 days at 225° C. | 5.3 | 5.6 | 5.4 |
| P: 7 days at 250° C. | 5.6 | 6.2 | 5.9 |
| S | | | |
| NP | 7.6 | 10.1 | 10 |
| P: 16 hours at 200° C. | 9.7 | 10.3 | 10 |
| P: 10 days at 225° C. | 7.1 | 6.2 | 6.8 |
| P: 7 days at 250° C. | 7.7 | 6.3 | 6.3 |
| EB | | | |
| NP | 640 | 540 | 520 |

TABLE 2-continued

| | 13 | 14 | 15 |
|---|---|---|---|
| P: 16 hours at 200° C. | 610 | 480 | 380 |
| P: 10 days at 225° C. | 360 | 300 | 250 |
| P: 7 days at 250° C. | 310 | 180 | 85 |
| TS | | | |
| NP | 32 | 31 | 32 |
| P: 16 hours at 200° C. | 33 | 28 | 29 |
| P: 10 days at 225° C. | 24 | 18 | 16 |
| P: 7 days at 250° C. | 18 | 13 | 11 |
| RCS | | | |
| P: 16 hours at 200° C. | 40 | 40 | 33 |
| ZR | | | |
| NP | 25 | 33 | 36 |
| P: 16 hours at 200° C. | 28 | 38 | 36 |
| EN | | | |
| NP | 0.63 | 1.30 | 1.50 |
| P: 16 hours at 200° C. | 1.10 | 1.70 | 3.10 |
| P: 10 days at 225° C. | 0.44 | 1.10 | 3.20 |
| P: 7 days at 250° C. | 2.60 | 3.90 | — |

TABLE 3

| EXAMPLES | | 13 | 14 | 15 |
|---|---|---|---|---|
| SAH | NP | 46 | 57 | 62 |
| | P 16 HOURS AT 200° C. | 56 | 65 | 70 |
| Δ SAH | | | | |
| ASTM 1 | NP | +4 | 0 | +1 |
| | P 16 HOURS AT 200° C. | −3 | −4 | −5 |
| ASTM 3 | NP | −14 | −19 | −21 |
| | P 16 HOURS AT 200° C. | −20 | −26 | −30 |
| Sunfill | NP | −15 | −18 | −16 |
| | P 16 HOURS AT 200° C. | — | — | — |
| S | NP | 7.6 | 10.1 | 10.0 |
| | P 16 HOURS AT 200° C. | 9.7 | 10.3 | 10.0 |
| Δ S | | | | |
| ASTM 1 | NP | −34 | −51 | −53 |
| | P 16 HOURS AT 200° C. | −46 | −46 | −48 |
| ASTM 3 | NP | −79 | −86 | −89 |
| | P 16 HOURS AT 200° C. | −84 | −86 | −86 |

TABLE 3-continued

| EXAMPLES | | 13 | 14 | 15 |
|---|---|---|---|---|
| Sunfill | NP | −54 | −76 | −28 |
| | P 16 HOURS AT 200° C. | — | — | — |
| AR % | NP | 640 | 540 | 520 |
| | P 16 HOURS AT 200° C. | 610 | 480 | 380 |
| Δ EB | | | | |
| ASTM 1 | NP | −40 | −40 | −49 |
| | P 16 HOURS AT 200° C. | −50 | −45 | −28 |
| ASTM 3 | NP | −73 | −78 | −80 |
| | P 16 HOURS AT 200° C. | −77 | −78 | −69 |
| Sunfill | NP | −43 | −56 | −40 |
| | P 16 HOURS AT 200° C. | — | — | — |
| Δ W | | | | |
| ASTM 1 | NP | +4.2 | +3.9 | +4.2 |
| | P 16 HOURS AT 200° C. | +4.9 | +4.3 | +5.4 |
| ASTM 3 | NP | +20 | +19 | +21 |
| | P 16 HOURS AT 200° C. | +19 | +20 | +24 |
| Sunfill | NP | +25 | +22 | +23 |
| | P 16 HOURS AT 200° C. | — | — | — |
| Δ V | | | | |
| ASTM 1 | NP | +6.6 | +5.4 | +6.4 |
| | P 16 HOURS AT 200° C. | +6.6 | +4.9 | +7.2 |
| ASTM 3 | NP | +26 | +25 | +26 |
| | P 16 HOURS AT 200° C. | +25 | +26 | +29 |
| Sunfill | NP | +36 | +31 | +33 |
| | P 16 HOURS AT 200° C. | — | — | — |
| RCS | NP | 78 | 47 | 64 |
| | P 16 HOURS AT 200° C. | 40 | 40 | 33 |
| | P 10 DAYS AT 225° C. | 19 | 24 | 25 |
| | P 7 DAYS AT 250° C. | 21 | 26 | 28 |

TABLE 4

| EXAMPLES | 16 | 1 | 2 | 17 | 11 | 12 |
|---|---|---|---|---|---|---|
| SAM | | | | | | |
| NP | 70 | 70 | 70 | 70 | 70 | 69 |
| P 16 HOURS AT 200° C. | 78 | 78 | 78 | 78 | 79 | 79 |
| P 10 DAYS AT 225° C. | 83 | 87 | 89 | 83 | 85 | 85 |
| P 7 DAYS AT 250° C. | 84 | 89 | 90 | 84 | 87 | 88 |
| LS | | | | | | |
| NP | 3.4 | 3.0 | 2.9 | 3.4 | 3.0 | 2.9 |
| P 16 HOURS AT 200° C. | 3.9 | 3.9 | 3.7 | 3.9 | 4.0 | 3.6 |
| P 10 DAYS AT 225° C. | 4.2 | 6.2 | 7.3 | 4.2 | 5.2 | 5.2 |
| P 7 DAYS AT 250° C. | 4.4 | 6.7 | 8.0 | 4.4 | 6.2 | 6.8 |
| S | | | | | | |
| NP | 8.7 | 8.2 | 8.1 | 8.7 | 8.4 | 7.9 |
| P 16 HOURS AT 200° C. | 8.7 | 9.5 | 9.5 | 8.7 | 9.2 | 8.1 |
| P 10 DAYS AT 225° C. | 7.0 | 7.0 | 7.0 | 7.0 | 6.8 | 6.1 |
| P 7 DAYS AT 250° C. | 6.6 | 6.7 | 6.7 | 6.6 | 6.3 | 6.4 |
| EB | | | | | | |
| NP | 260 | 230 | 230 | 260 | 230 | 230 |
| P 16 HOURS AT 200° C. | 250 | 180 | 190 | 250 | 180 | 170 |
| P 10 DAYS AT 225° C. | 135 | 140 | 90 | 135 | 125 | 90 |
| P 7 DAYS AT 250° C. | 95 | 75 | 60 | 95 | 85 | 70 |
| TS | | | | | | |
| NP | 19 | 18 | 19 | 19 | 19 | 19 |
| P 16 HOURS AT 200° C. | 19 | 21 | 21 | 19 | 22 | 22 |
| P 10 DAYS AT 225° C. | 16 | 18 | 20 | 16 | 17 | 17 |
| P 7 DAYS AT 250° C. | 16 | 19 | 20 | 16 | 18 | 19 |
| RCS | | | | | | |
| P 16 HOURS AT 200° C. | 41 | 37 | 40 | 41 | 40 | 42 |
| ZR | | | | | | |
| NP | 32 | 31 | 30 | 32 | 31 | 30 |
| P 16 HOURS AT 200° C. | 34 | 32 | 31 | 34 | 34 | 34 |
| EM | | | | | | |
| EM | 3.1 | 3.2 | 3.3 | 3.1 | 3.6 | 2.8 |
| P 16 HOURS AT 200° C. | 3.8 | 5.6 | 5.4 | 3.8 | 5.6 | 5.0 |
| P 10 DAYS AT 225° C. | 5.8 | 6.1 | — | 5.8 | 6.0 | — |
| P 7 DAYS AT 250° C. | — | — | — | — | — | — |

TABLE 5

| EXAMPLES | | 16 | 1 | 2 | 17 | 11 | 12 |
|---|---|---|---|---|---|---|---|
| SAH | P 16 h at 200° C. | 78 | 78 | 78 | 78 | 79 | 79 |
| Δ SAH | ASTM 1 | −3 | −4 | −3 | −3 | −3 | −3 |
| | ASTM 3 | −31 | −21 | −21 | −31 | −23 | −22 |
| | SUNFILL | — | −22 | −15 | — | −15 | −18 |
| S | P 16 h at 200° C. | 8.7 | 9.5 | 9.5 | 8.7 | 9.2 | 8.1 |
| Δ S | ASTM 1 | −33 | −27 | −24 | −33 | −33 | −23 |
| | ASTM 3 | −76 | −40 | −35 | −76 | −61 | −44 |
| | SUNFILL | — | −46 | −18 | — | −20 | −32 |
| EB | P 16 h at 200° C. | 250 | 180 | 190 | 250 | 180 | 170 |
| Δ EB | ASTM 1 | −43 | −13 | −19 | −43 | −32 | −24 |
| | ASTM 3 | −61 | −16 | −19 | −61 | −42 | −32 |
| | SUNFILL | — | −39 | −24 | — | −21 | −17 |
| Δ W | ASTM 1 | +3.5 | +3.7 | +3.5 | +3.5 | +3.3 | +3.3 |
| P 16 h at 200° C. | ASTM 3 | +18 | +18 | +18 | +18 | +18 | +18 |
| | SUNFILL | — | +13 | +13 | — | +14 | +15 |
| Δ V | ASTM 1 | +6.5 | +5.9 | +6.1 | +6.5 | +5.4 | +5.5 |
| P at 16 h at 200° C. | ASTM 3 | +28 | +29 | +28 | +28 | +27 | +28 |
| | SUNFILL | — | +25 | +22 | — | +25 | +27 |

TABLE 6

| EXAMPLES | 3 | 4 | 5 | 6 | 7 | 8 |
|---|---|---|---|---|---|---|
| NP | | | | | | |
| SAH | 63 | 82 | 62 | 66 | 64 | 62 |
| LS | 2.25 | 1.60 | 2.25 | — | 2.25 | 2.25 |
| S | 9.25 | 8.50 | 9.60 | 11.2 | 9.30 | 8.30 |
| EB | 300 | 120 | 325 | 310 | 345 | 300 |
| TS | 21 | 17 | 22 | 18 | 23 | 22 |
| RCS | 34 | 40 | 30 | 37 | 37 | 25 |
| ZR | 49 | 51 | 50 | — | 46 | 51 |
| P 4 h at 200° C. | | | | | | |
| SAH | 66 | 82 | 66 | | 68 | 64 |
| LS | 2.90 | 2.25 | 2.75 | | 2.90 | 2.75 |
| S | 9 | 8.25 | 9.00 | | 9.15 | 8.65 |
| EB | 295 | 115 | 295 | | 340 | 305 |
| TS | 22 | 18 | 21 | | 23 | 21 |
| RCS | 19 | 29 | 13 | | 16 | 14 |
| ZR | 49 | 49 | 51 | | 49 | 51 |
| Oil ASTM 1 | | | | | | |
| SAH and Δ SAH | 60 (−6) | 80 (−2) | 60 (−6) | | 66 (−2) | 59 (−5) |
| S and Δ S | 7.5 (−16) | 8.8 (+6.7) | 8.30 (−7.8) | | 6.70 (−27) | 7.90 (−8.7) |
| EB and Δ EB | 330 (+10) | 125 (+8.7) | 365 (+24) | | 305 (−10) | 375 (+23) |
| Δ W | 4.2 | 2.3 | 4.6 | | 4.5 | 5 |
| Δ V | 5.5 | 4.2 | 5.8 | | 6 | 6.8 |
| Oil ASTM 3 | | | | | | |
| SAH and Δ SAH | 43 (−23) | 64 (−18) | 44 (−22) | 46 (−20) | 47 (−21) | 42 (−22) |
| S and Δ S | 4.7 (−49) | 6.5 (−21) | 4.4 (−51) | 6 (−46) | 3.07 (−66) | 4.2 (−51) |
| EB and Δ EB | 300 (0) | 115 (0) | 241 (−18) | 195 (−37) | 200 (−41) | 265 (−13) |

TABLE 6-continued

| | | | | | | |
|---|---|---|---|---|---|---|
| Δ W | 33 | 19 | 34 | — | 31 | 35 |
| Δ V | 40 | 30 | 41 | 37 | 37 | 42 |
| EXAMPLES | 9 | 10 | 18 | 19 | 20 | 21 |
| NP | | | | | | |
| SAH | 79 | 91 | 60 | 50 | 50 | 67 |
| LS | 1.90 | 1.60 | 2.40 | — | — | — |
| S | 8.95 | 8.50 | 9.20 | 10 | 10.5 | 11.6 |
| EB | 140 | 75 | 340 | 470 | 310 | 315 |
| TS | 18 | 22 | 23 | 20 | 22.5 | 21 |
| RCS | 30 | 28 | 44 | 60 | 74 | 47 |
| ZR | 50 | 44 | 48 | — | — | — |
| P 4 h at 200° C. | | | | | | |
| SAH | 82 | 91 | 64 | | | |
| LS | 2.25 | 1.90 | 3.05 | | | |
| S | 8.80 | 8.50 | 10.4 | | | |
| EB | 130 | 65 | 375 | | | |
| TS | 19 | 21 | 22 | | | |
| RCS | 18 | 28 | 19 | | | |
| ZR | 50 | 45 | 50 | | | |
| Oil ASTM 1 | | | | | | |
| SAH and Δ SAH | 80 (−2) | 89 (−2) | 59 (−5) | | | |
| S and Δ S | 8.65 (−1.7) | 8.6 (+1) | 8.00 (−23) | | | |
| EB and Δ EB | 135 (+3.9) | 70 (+8) | 400 (+67) | | | |
| Δ W | 2 | 2.4 | 4.6 | | | |
| Δ V | 3.9 | 3.7 | 5.8 | | | |
| Oil ASTM 3 | | | | | | |
| SAH and Δ SAH | 64 (−18) | 76 (−15) | 42 (−22) | 28 (−22) | 26 (−24) | 42* (−25) |
| S and Δ S | 5.7 (−35) | 6.8 (−20) | 2.4 (−77) | 5.5 (−45) | 4.2 (−60) | 5.3 (−54) |
| EB and Δ EB | 100 (−23) | 65 (0) | 205 (−45) | 275 (−40) | 280 | 210 |
| Δ W | 18 | 17 | 32 | — | — | — |
| Δ V | 20 | 25 | 39 | 49 | 50 | 50 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A heat-vulcanizable organopolysiloxane composition of matter, comprising:
   (A) 100 parts of at least one diorganoprlysiloxane resin having a viscosity greater than 1,000,000 mPa.s at 25° C.,
   (B) 5 to 150 parts of a reinforcing filler,
   (C) 0.1 to 7 parts of an organic peroxide,
   (D) 0.01 to 5 parts of an organosilicon compound containing at least one acryloyloxyalkyl or methacryloyloxyalkyl group bonded to a silicon atom, and
   (E) 0.1 to 20 parts of at least one oxide or hydroxide of an alkaline earth metal.

2. The composition of matter as defined by claim 1, wherein the resin (A) comprises a concatenation of siloxy units of the formula $R_2SiO$, which are blocked at each end of the polymer chains by a siloxy unit of the formula $R_3SiO_{0.5}$ and/or a radical of formula OR'; in which formulae the symbols R, which are identical or different, are selected from the group consisting of methyl, ethyl, n-propyl, phenyl, vinyl and 3,3,3-trifluoropropyl radicals, at least 60% of the number of such radicals being methyl radicals and at most 3 mol % of the siloxy units being organovinylsiloxy units, and the symbol R' represents a hydrogen atom, an alkyl radical containing from 1 to 4 carbon atoms or the beta-methoxyethyl radical.

3. The composition of matter as defined by claim 1, said fillers (B) comprising pyrogenic silicas or precipitated silicas.

4. The composition of matter as defined by claim 1, said organosilicon compound (D) bearing at least one acryloyloxyalkyl or methacryloyloxyalkyl group comprising:
   (i) a silane (1) corresponding to the formula:

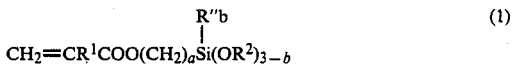

$$CH_2=CR^1COO(CH_2)_aSi(OR^2)_{3-b} \overset{R''b}{|} \quad (1)$$

in which the symbol R" represents methyl, vinyl and phenyl radicals, the symbol $R^1$ represents a hydrogen atom or the methyl radical, the symbol $R^2$ represents a methyl, ethyl, n-propyl or beta-methoxyethyl radical, the symbol a represents a number from 1 to 5 and the symbol b represents a number from 0 to 2;
   (ii) the products of partial hydrolysis of the above silane (1); or
   (iii) the polymerizates of the reaction of the silane (2) of the formula $CH_2=C(R^1)COO(CH_2)_aSi(OR^2)_3$, with a diorganopolysiloxane oil having a viscosity not exceeding 5,000 mPa.s at 25° C., which comprises a concatenation of units of formula $R''_2SiO$ blocked at each end of the polymer chain by a hydroxyl radical, at least 40% of the number of radicals represented by R" being methyl and the remainder selected from the group consisting of methyl, phenyl and vinyl radicals.

5. The composition of matter as defined by claim 1, said oxide or hydroxide (E) comprising MgO, CaO, $Mg(OH)_2$ or $Ca(OH)_2$.

6. The composition of matter as defined by claim 2, further comprising 0.1 to 10 parts of a diorganopolysiloxane oil (F) having a viscosity not exceeding 5,000 mPa.s at 25° C. which comprises a concatenation of units of the formula R"$_2$SiO, blocked at each end of the polymer chain by a radical of the formula OR'; in these formulae, at least 40% of the number of radicals represented by R" are methyl radicals and the remainder are selected from the group consisting of methyl, phenyl and vinyl radicals.

7. The composition of matter as defined by claim 6, further comprising from 5 to 120 parts of semireinforcing or packing fillers (B').

8. The composition of matter as defined by claim 7, comprising:
100 parts of said resin (A),
8 to 100 parts of said reinforcing filler (B),
10 to 50 parts of said semi-reinforcing or packing filler (B'),
0.2 to 5 parts of said organic peroxide (C),
0.1 to 2 parts of said organosilicon compound (D),
1 to 10 parts of said oxide or hydroxide of an alkaline earth metal (E), and
0.4 to 5 parts of said diorganopolysiloxane oil (F).

9. The composition of matter as defined by claim 1, Wherein the compound (D) comprises gammamethacryloyloxypropyltrimethoxysilane.

10. The composition of matter as defined by claim 1, in cured elastomeric state.

11. A shaped article comprising the elastomeric organopolysiloxane as defined by claim 10.

* * * * *